United States Patent [19]
Oda et al.

[11] 4,326,038
[45] Apr. 20, 1982

[54] SEALING COMPOSITION AND SEALING METHOD

[75] Inventors: Isao Oda, Nagoya; Masayuki Kaneno, Tokoname, both of Japan

[73] Assignee: NGK Insulators, Ltd., Nagoya, Japan

[21] Appl. No.: 262,794

[22] Filed: May 11, 1981

Related U.S. Application Data

[63] Continuation-in-part of Ser. No. 82,149, Oct. 5, 1979, abandoned, which is a continuation of Ser. No. 919,070, Jun. 26, 1978, abandoned.

[30] Foreign Application Priority Data

Jun. 29, 1977 [JP] Japan ................. 52-76550

[51] Int. Cl.$^3$ ................................. C03C 3/12
[52] U.S. Cl. ........................ 501/41; 427/279
[58] Field of Search .............. 106/47 R, 73.2; 313/220, 221; 427/279

[56] References Cited

U.S. PATENT DOCUMENTS

| | | | |
|---|---|---|---|
| 2,876,120 | 3/1959 | Machlan | 106/47 R |
| 3,441,421 | 4/1969 | Sarver et al. | 106/73.4 |
| 3,448,319 | 6/1969 | Louden | 313/221 |
| 3,469,729 | 9/1969 | Grekils et al. | 106/47 R |
| 3,545,639 | 12/1970 | Charles et al. | 106/47 R |
| 3,588,573 | 6/1971 | Chen et al. | 106/47 R |
| 4,076,991 | 2/1978 | Datta | 313/220 |

*Primary Examiner*—O. R. Vertiz
*Assistant Examiner*—Mark Bell
*Attorney, Agent, or Firm*—Stevens, Davis, Miller & Mosher

[57] ABSTRACT

A sealing composition consisting of 35–50% by weight of aluminum oxide, 35–50% by weight of calcium oxide, 1–10% by weight of yttrium oxide and 1–15% by weight of strontium oxide has a high wettability with alumina ceramics and refractory metal, and further has high heat resistance and resistance against sodium vapor. The sealing composition is excellent for sealing alumina arc tubes for high intensity discharge lamps with ceramics or refractory metal. Included within the scope of the invention is a composition consisting of 40–50% by weight of aluminum oxide, 35–43% by weight of calcium oxide, 3–10% by weight of yttrium oxide and 8–15% by weight of strontium oxide, as well as methods for using the compositions.

2 Claims, No Drawings

SEALING COMPOSITION AND SEALING METHOD

This application is a continuation-in-part of application Ser. No. 82,149, filed Oct. 5, 1979, now abandoned, which in turn was a continuation of application Ser. No. 919,070, filed June 26, 1978, now also abandoned.

BACKGROUND OF THE INVENTION (1) Field of the Invention

The present invention relates to a sealing composition for sealing ceramics mutually or for sealing ceramics with metal, and a sealing method. More particularly, the present invention relates to a sealing compositon which is used in the sealing of arc tubes, which are made of translucent alumina ceramics and used for high-pressure vapor discharge lamps, with ceramics or refractory metal, and a sealing method using the sealing composition.

(2) Description of the Prior Art

There have hitherto been developed and used various sealing compositions for sealing translucent alumina tubes, whic are used as arc tubes for high-pressure vapor discharge lamps, with alumina ceramics or refractory metals, such as niobium, molybdenum and the like.

The sealing compositions of this kind must have a high bonding strength and at the same time have heat resistance and resistance against the high temperature vapor of alkali metal during lamp operation. As such sealing compositions, there have been used titanium-nickel alloys, called the activated metal process, and glass compositions such as aluminum oxide-calcium oxide-magnesium oxide systems (hereinafter, abbreviated as $Al_2O_3$—CaO—MgO systems), aluminum oxide-calcium oxide-silicon dioxide-magnesium oxide-barium oxide systems (hereinafter, abbreviated as $Al_2O_3$-CaO—$SiO_2$—MgO—BaO systems), or aluminum oxide-calcium oxide-silicon dioxide systems (hereinafter, abbreviated as $Al_2O_3$—CaO—$SiO_2$ systems). However, titanium-nickel alloy is insufficient in heat resistance, and when the sealed portion is heated to high temperature, the gas tightness of the sealed portion is likely to deteriorate. The glass compositions based on the system of $Al_2O_3$—CaO—$SiO_2$ are apt to crystallize at high temperature, causing cracks in the sealed portion. Further, since these glass compositions are poor in corrosion resistance against alkali metal vapor at high temperature, there is a danger of leakage of the sealed portion.

SUMMARY OF THE INVENTION

The present invention provides a sealing composition, which is free from the above described drawbacks of conventional sealing compositions, and a sealing method using the composition.

A feature of the present invention is the provision of a sealing composition for sealing ceramics mutually or for sealing ceramics with metal, consisting of 35–50% by weight of aluminum oxide ($Al_2O_3$), 35–50% by weight of calcium oxide (CaO), 1–10% by weight of yttrium oxide ($Y_2O_3$) and 1–15% by weight of strontium oxide (SrO), preferably consisting of 40–50% by weight of aluminum oxide, 35–45% by weight of calcium oxide, 5–10% by weight of yttrium oxide and 5–15% by weight of strontium oxide. Included within the scope of the invention is a composition consisting of 40–50% by weight of aluminum oxide 35–43% by weight of calcium oxide, 3–10% by weight of yttrium oxide and 8–15% by weight of strontium oxide.

Another feature of the present invention is the provision of a sealing method using the sealing composition.

The sealing composition of the present invention has a high wettability with alumina ceramics and refractory metals, such as niobium, tungsten and the like, and further high heat resistance and alkali resistance. Therefore, the sealed portion by the composition neither cracks nor causes leakage due to the corrosion by the alkali metal vapor, such as sodium and the like, during lamp operation.

DESCRIPTION OF THE PREFERRED EMBODIMENTS

Compounds of aluminum, calcium, yttrium and strontium are mixed so that the resulting mixture contains 35–50% by weight (hereinafter, % means by weight), calculated as oxide, of $Al_2O_3$, 35–50% of CaO, 1–10% of $Y_2O_3$ and 1–15% of SrO. Included within such mixtures are mixtures consisting of 40–50% of aluminum oxide, 35–43% of calcium oxide, 3–10% of yttrium oxide and 8–15% of strontium oxide. The mixture is pulverized together with a solvent, such as ethanol, for several hours in a ball mill and then dried. In the case where the compound of aluminum, calcium, yttrium or strontium is not oxide, the dried mixture is preferably subjected to a calcination to convert the compound to oxide. The dried mixture is homogeneously mixed together with a binder, such as polyvinyl alcohol, to prepare a pasty or compacted sealing composition.

The pasty sealing composition is applied to the portion to be sealed of an arc tube for a high-pressure vapor discharge lamp or the compacted sealing composition is placed on the portion to be sealed of the tube, and the above treated tube is heated at a temperature of 1,400°–1,500° C. under vacuum or under an inert gas atmosphere to melt the sealing composition, whereby a gap to be sealed is filled with the melted sealing composition by capillary action, and then the melted sealing composition filled in the gap is solidified to seal the gap upon cooling.

In the present invention, $Y_2O_3$ and SrO enhance the reactivity of an alumina ceramic article with the sealing composition and improve the resistance against sodium of the sealing composition. That is, $Y_2O_3$ reacts with $Al_2O_3$ in an alumina ceramic article to form a compound, whereby a strong bond is formed between the sealing composition and the alumina ceramic article to improve the adhering strength therebetween. Moreover, since $Y_2O_3$ and SrO have a high resistance against sodium, the sealing composition is not corroded by the high-temperature vapor of sodium even during lamp operation. $Al_2O_3$ in the composition diffuses into alumina ceramics to form a strong bond between the sealing composition and the alumina ceramics, and further acts to match the thermal expansion coefficient between the sealing composition and alumina ceramics. CaO reacts with refractory metals, such as niobium and the like, to form a strong bond between the sealing composition and the metals.

In the present invention, the chemical composition of the sealing material is limited based on the following reason. A sealing composition containing 35–50% of $Al_2O_3$, 35–50% of CaO, 1–10% of $Y_2O_3$ and 1–15% of SrO, has a high wettability with alumina ceramics and refractory metal, and forms a gas tight sealing, which is free from cracks and leakage and is not corroded by the high-temperature vapor of sodium during lamp operation. The same applies to sealing compositions containing 40-50% of $Al_2O_3$, 34-43% of CaO, 3-10% of $Y_2O_3$ and 8-15% of SrO.

However, a sealing material having a composition outside the above described ranges is poor in wettability with alumina ceramics and refractory metal, precipitates a large amount of crystals, or has a large difference between the thermal expansion coefficient of the composition and that of alumina ceramics, causing cracks in the sealed portion. Moreover, the composition is corroded with high-temperature vapor of sodium. Therefore, the gas tightness of the sealed portion by the composition is deteriorated. Further, it is preferable to limit the amount of impurities other than the essential components of $Al_2O_3$, CaO, $Y_2O_3$ and SrO to not more than 1% in order to improve the resistance against sodium of the resulting composition. Particularly, it is necessary that the amount of $SiO_2$, MgO and the like, which are easily corroded with high-temperature vapor of sodium, must be limited to not more than 1%.

The following example is given for the purpose of illustration of this invention and is not intended as a limitation thereof.

EXAMPLE

A mixture of powdery oxides or carbonates of aluminum, calcium, yttrium and strontium in a mixing ratio, calculated as oxide, as shown in the following Tables 1 and 2 was pulverized together with ethanol in an alumina ball mill for 5 hours, and dried. The dried mixture was added with polyvinyl alcohol as a binder to produce pasty sealing composition samples No. 1-No. 10 (in both Tables 1 and 2) of the present invention. In the above procedure, when carbonates were used, the dried mixture was calcined at 1,100° C. for 1 hour to convert the carbonates into oxides before adding binder. The pasty sealing composition was formed into a tablet having a hole at the center. The tablet was placed on a disk, which was made of a high-density alumina sintered body having a purity of not less than 99% and provided at its center with a niobium tube for electrode therethrough. Then, the disk was fixed into both ends of a translucent alumina tube having an outer diameter of 9 mm, a length of 110 mm and a thickness of 0.9 mm such that the tablet was placed between the disk and the alumina tube and that the niobium tube was extended through the center hole of the tablet. The resulting assembly was heated to 1,450° C. at a heating rate of 50° C./min in a vacuum furnace, kept for 10 minutes at 1,450° C., and then cooled to obtain a sealed arc tube for a high-pressure vapor discharge lamp. The results of the gas tightness test and the resistance test against sodium of the resulting sealed tube are shown in the following Tables 1 and 2. In the gas tightness test, samples were subjected to a gas tightness test under a presure of $10^{-9}$ mmHg by means of a helium leak detector, and the number of tubes passing the test was counted. In the resistance test against sodium, a 400 W high-pressure sodium lamp was produced from a sealed arc tube passing the above described gas tightness test, and the durability of the sodium lamp was measured.

Further, the contact angle (this angle may be called the wetting angle) between the sealing composition and alumina was measured and the wettability of the sealing composition was evaluated from the angle. The result of the wettability test is also shown in Tables 1 and 2. In the wettability test, a sealing composition previously press molded into a cylinder having a diameter of 3 mm and a height of 3 mm was placed on an alumina sintered body, and then heated at a temperature of 1,450° C. for 10 minutes under vacuum, after which the contact angle between the sealing composition and the alumina sintered body was measured by an optical microscope. When the contact angle was 0°-20°, the wettability was evaluated as A; when the angle was 21°-40°, the wettability was evaluated as B; and when the angle was 41°-60°, the wettability was evaluated as C.

For comparison, the above described tests were carried out with respect to conventional sealing compositions based on the system of $Al_2O_3$—CaO—MgO and $Al_2O_3$—CaO—$SiO_2$—MgO—BaO, and the results are also shown in Tables 1 and 2.

TABLE 1

| | Sample No. | Composition | | | | Gas tightness (number of passed test samples) | Resistance against sodium vapor | Wettability |
|---|---|---|---|---|---|---|---|---|
| | | $Al_2O_3$ | CaO | $Y_2O_3$ | SrO | | | |
| | 1 | 35 | 40 | 10 | 15 | 10 | at least 15,000 hrs. | A |
| | 2 | 40 | 40 | 7.5 | 12.5 | 10 | at least 15,000 hrs. | B |
| | 3 | 40 | 45 | 5 | 10 | 10 | at least 15,000 hrs. | A |
| | 4 | 45 | 50 | 4 | 1 | 10 | at least 15,000 hrs. | B |
| | 5 | 45 | 44 | 1 | 10 | 10 | at least 15,000 hrs. | A |
| Sealing composition of the present invention | 6 | 45 | 45 | 5 | 5 | 10 | at least 15,000 hrs. | A |
| | 7 | 50 | 35 | 5 | 10 | 10 | at least 15,000 hrs. | B |
| | 8 | 50 | 40 | 5 | 5 | 10 | at least 15,000 hrs. | B |
| | 9 | 48 | 44 | 3 | 5 | 10 | at least 15,000 hrs. | A |
| | 10 | 35 | 50 | 5 | 10 | 10 | at least 15,000 hrs. | A |
| Conven- | 11 | $Al_2O_3$ 50% + CaO 42% + | | | | 9 | leak occurs | |

TABLE 1-continued

| | Sample No. | Composition Al$_2$O$_3$ CaO Y$_2$O$_3$ SrO | Gas tightness (number of passed test samples) | Resistance against sodium vapor | Wettability |
|---|---|---|---|---|---|
| tional sealing composition | | MgO 8% | | after 6,500 hrs. leak occurs | C |
| | 12 | Al$_2$O$_3$45% + CaO45% + SiO$_2$0.1% + MgO8% + BaO1.9% | 10 | after 9,000 hrs. | A |

TABLE 2

| | Sample No. | Composition | | | | Gas tightness (number of passed test samples | Resistance against sodium vapor | Wettability |
| | | Al$_2$O$_3$ | CaO | Y$_2$O$_3$ | SrO | | | |
|---|---|---|---|---|---|---|---|---|
| | 1 | 40 | 40 | 7.5 | 12.5 | 10 | at least 15,000 hrs. | B |
| | 2 | 40 | 43 | 6 | 11 | 10 | at least 15,000 hrs. | A |
| | 3 | 42 | 43 | 5 | 10 | 10 | at least 15,000 hrs. | A |
| | 4 | 45 | 35 | 7.5 | 12.5 | 10 | at least 15,000 hrs. | B |
| Sealing composition of the present invention | 5 | 45 | 40 | 5 | 10 | 10 | at least 15,000 hrs. | A |
| | 6 | 45 | 40 | 7 | 8 | 10 | at least 15,000 hrs. | A |
| | 7 | 45 | 43 | 4 | 8 | 10 | at least 15,000 hrs. | A |
| | 8 | 50 | 35 | 5 | 10 | 10 | at least 15,000 hrs. | B |
| | 9 | 50 | 37 | 4 | 9 | 10 | at least 15,000 hrs. | B |
| | 10 | 50 | 39 | 3 | 8 | 10 | at least 15,000 hrs. | B |
| Conventional sealing composition | 11 | Al$_2$O$_3$50% + CaO42% + MgO8% | | | | 9 | leak occurs after 6,500 hrs. | C |
| | 12 | Al$_2$O$_3$45% + CaO45% + +MGO8% + BaO1.9% SiO$_2$0.1% + MgO8% + BaO1.9% | | | | 10 | leak occurs after 9,000 hrs. | A |

It can be seen from Tables 1 and 2 that the sealing compositions of the present invention have high wettability with alumina and resistance against sodium vapor, and give a sealed tube having an excellent gas tightness. On the contrary, the conventional Al$_2$O$_3$—CaO—MgO system sealing composition (sample No. 11 in both tables) turned to black after about 6,000 hours lamp operation, and leakage of the sealed tube was observed after 6,500 hours. Further, the Al$_2$O$_3$—CaO—SiO$_2$—MgO—BaO system sealing composition (sample No. 12 in both tables) turned to black after 8,400 hours lamp operation and leakage of the sealed tube was observed after 9,000 hours.

As described above, the sealing operation of the present invention which contains given amounts of specifically limited oxides has a high wettability with alumina ceramics and refractory metal and further has high heat resistance and resistance against sodium vapor. Therefore, the sealing composition is excellent for sealing the portion to be sealed of an arc tube consisting of a translucent alumina and used for high-pressure vapor discharge lamps, and it is very useful for industrial purposes.

What is claimed is:

1. A sealing composition for sealing ceramics mutually or sealing ceramics and metal, consisting of 40-50% by weight of aluminum oxide, 35-43% by weight of calcium oxide, 3-10% by weight of yttrium oxide and 8-15% by weight of strontium oxide.

2. A sealing method comprising placing a pasty or compacted sealing composition consisting of 40-50% by weight of aluminum oxide, 35-43% by weight of calcium oxide, 3-10% by weight of yttrium oxide and 8-15% by weight of strontium oxide on a portion to be sealed, heating the pasty or compacted sealing composition to melt the composition so as to fill with the melted composition a gap to be sealed, and then solidifying the melted composition filled in the gap to seal the gap upon cooling.

* * * * *